United States Patent
Du et al.

(10) Patent No.: US 7,136,371 B2
(45) Date of Patent: Nov. 14, 2006

(54) TIME SLOT SORTING METHOD FOR A WIRELESS NETWORK

(75) Inventors: Yonggang Du, Aachen (DE); Christoph Herrmann, Aachen (DE); Peter May, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 809 days.

(21) Appl. No.: 09/817,457

(22) Filed: Mar. 26, 2001

(65) Prior Publication Data
US 2004/0202144 A1    Oct. 14, 2004

(30) Foreign Application Priority Data
Mar. 28, 2000    (DE)    ................ 100 15 390

(51) Int. Cl.
H04J 3/24    (2006.01)
H04L 12/28    (2006.01)
H04L 12/56    (2006.01)
(52) U.S. Cl. .................. 370/349; 370/395.1
(58) Field of Classification Search ............ None
See application file for complete search history.

(56) References Cited

U.S. PATENT DOCUMENTS 4,153,884 A * 5/1979 Ikeguchi et al. ........... 331/1 A
6,411,812 B1 * 6/2002 Schultz et al. ............. 455/466
6,466,789 B1 * 10/2002 Bruhn et al. ............... 455/436
2003/0014330 A1 * 1/2003 Showghi et al. ............ 705/26

FOREIGN PATENT DOCUMENTS

EP    0831620 A2    3/1998

* cited by examiner

*Primary Examiner*—Huy D. Vu
*Assistant Examiner*—Blanche Wong
(74) *Attorney, Agent, or Firm*—Larry Liberchuk

(57) ABSTRACT

The invention relates to a wireless network defined as a group of wireless terminals and an assigned central station. After receiving requests for the wireless transmission of packets between a transmitting and a receiving terminal during a time multiplex frame, the central station assigns time slots within a following time multiplex frame for the transmission of packets from transmitting to receiving terminals. After reception of all the transmission requests, the central station determines a first subset of the group that intend to transmit to receiving terminals, and a second subset containing all transmitting terminals (of the group) that are not contained in the first subset. An order in which the transmitting terminals of the first subset will transmit is determined in accordance with the decreasing number of receiving terminals assigned to each transmitting terminal. The receiving terminals of the first subset are subdivided into a first group, and into a second group where the second group contains all the receiving terminals not contained in the first group, and the receiving terminals of the second group are selected for reception first in time.

3 Claims, 1 Drawing Sheet

TIME SLOT SORTING METHOD FOR A WIRELESS NETWORK

BACKGROUND OF THE INVENTION

Figure 1:
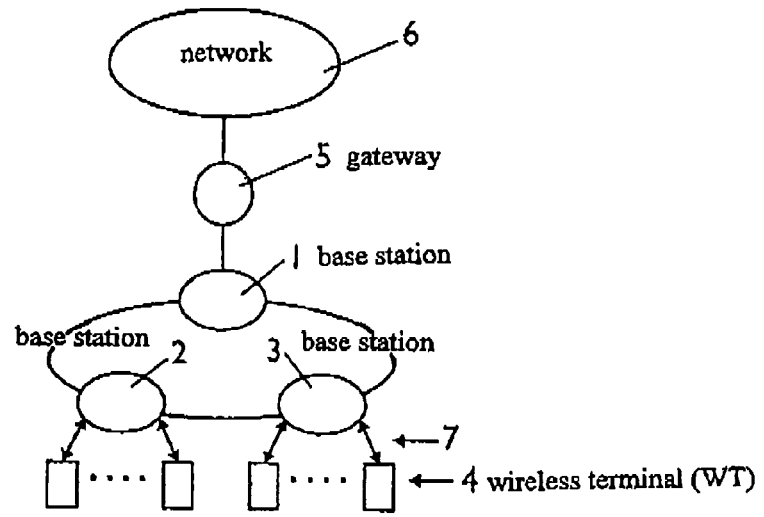

The invention relates to a wireless network comprising a plurality of terminals and an assigned central station, which network, after receiving requests for the wireless transmission of packets between a transmitting and a receiving terminal during a time multiplex frame, is provided for assigning time slots of a following time multiplex frame for the wireless transmission of packets from a transmitting to a receiving terminal.

Any data or packets can be sent via a wireless network of this type. A packet transmission is effected, for example, in the asynchronous transfer mode (ATM=asynchronous transfer mode), which has been developed for transmitting multimedia data between network nodes or devices respectively of a network node of a network. Prior to a connection set-up, for example between two network nodes in such an ATM network agreements about transmission parameters (for example, about bandwidth) are transported and according to the agreement various types of data (for example video and audio data) are inserted into cells. These cells are then transmitted over a single link to a receiving device. The receiving device verifies whether the received data have been transmitted error-free and, if necessary, the receiving device returns data to the transmitting device in response to the received cells.

The asynchronous transfer mode has actually been developed for transmitting data through wire-bound media (for example optical cables or copper cables). However, there are also wireless ATM networks that have been developed as a substitute for the wire-bound media. Such a wireless network transmits, for example, data over radio or infrared links and is known, for example, from EP 0 831 620 A2. A protocol is used here for the MAC layer (MAC=Medium Access Control) of a wireless ATM network.

SUMMARY OF THE INVENTION

One object of the invention is providing an optimized time slot sorting mechanism. Another object of the invention includes a wireless network which implements a time slot sorting mechanism.

In one embodiment of the invention, a wireless network is provided which implements a time slots sorting method, the time slots sorting method optimized for use in such a wireless network. In one form, the inventive method includes determining a first subset from a set of all transmitting terminals comprising the network, the first subset defined by a characteristic that each transmitting terminal included in the first subset intends to transmit packets to a plurality of receiving terminals, such that a second subset is further determined which comprises all transmitting terminals remaining in the set which do not comprise the first subset, determining the order in which the transmitting terminals of the first subset transmit in dependence upon a decreasing number of receiving terminals assigned to each transmitting terminal therein, subdividing the receiving terminals assigned to each transmitting terminal of the first subset into a first group, which first group contains all the receiving terminals designated as transmitting terminals, such that a second group is formed comprising, all the other receiving terminals, determining the receiving order in the first group and second group in accordance with the transmission order of each respective terminal, and selecting the receiving terminal of the second group to receive data first in time.

In such a wireless network, which implements a TDMA method, a certain frequency range is used. It is then impossible for a transceiver device of a central station (base station or central terminal) to switch over from a reception mode to a transmission mode and vice versa without delay. There is a non-negligible minimum time abbreviated to time MT between the two modes. The time MT is a parameter of a radio system and is to be taken into account by the part of a transceiver device responsible for the Media Access Control (MAC). For taking all possible traffic ratios in the wireless network into account and giving the various terminals enough time to switch-over their transmission mode, a time is defined that is longer than the time MT and is referred to as time OTT. The delay caused by the time OTT is optimized by the invention.

The central station sorts out the transmission order of the transmitting terminals and the receiving order of the receiving terminals assigned to a transmitting terminal. A first subset then contains all the transmitting terminals that intend to transmit packets to a plurality of receiving terminals, and a second subset contains the rest of the transmitting terminals. The transmitting terminals of the first subset are sorted out so that first the transmitting terminal that has the most receiving terminals can transmit and, finally, the transmitting terminal that has the fewest assigned receiving terminals. The first subset of receiving terminals assigned to a transmitting terminal are subdivided into two different groups. A first group contains all the receiving terminals that have previously already been assigned as transmitting terminals. The order of the two groups is determined so that the receiving terminals of the second group can receive data first.

The different methods of the inventions include subdividing the transmitting terminals of the second subset into the transmission order of the first subset. The inventions further include a wireless network with a central station having a plurality of terminals, which implement an inventive method as described.

DESCRIPTION OF THE DRAWING FIGURES

Examples of at least one embodiment of inventive wireless networks implementing the methods of the inventions will be explained/described with reference to FIGS. 1 and 2. The Figures each show examples of the embodiments of wireless networks for packet transmission, within which the inventive methods are implemented.

DETAILED DESCRIPTION OF THE INVENTION

The network as shown in FIG. 1 comprises a base station configuration, which includes various base stations 1 to 3. The base stations control the communication between various wireless terminals 4. The base station 1 is coupled via a connecting station 5 (gateway) to a wire-bound network 6 and exchanges packets between the connecting station 5 and a certain base station 2 and/or 3 in dependence on the address of a packet. The connecting station 5 is used for exchanging packets containing, for example, audio and video data between the wire-bound and a wireless network which comprises base stations 1 and 3 and terminals 4. The base stations 2 and 3 include each a transceiver device by which they exchange data with the terminals 4 via radio links 7. The base stations 1 to 3 and the connecting station 5 are typically interconnected via optical or metallic cables; and The network shown in FIG. 2 reflects an ad hoc configuration of a network of this invention, and includes various wireless terminals 8 to 11, of which one terminal is referred to as a controller. The controller controls the communication between the terminals. The terminal 8 is coupled to a wire-bound network 13 via a connecting station 12 (gateway). The connecting station 12 is typically connected to the wire-bound network and the terminal 8 via optical or metallic cables. The wireless terminals 8 to 11 (and also the terminals 4 in FIG. 1), which have each a transceiver device and at least one terminal station, exchange data via radio links 14. A terminal station may be, for example, a personal computer, a video camera, a digital telephone, a digital television or a set top box.

As discussed above, one of the terminals in FIG. 2 is arranged as a central controller, which controls the radio traffic between the terminals 8 to 11. For example, the terminal 11 can be the central controller. An exchange of data may be effected between the terminals 8 to 11. An exchange of control data mainly takes place between a terminal 8 to 10 and the controller 11. However, it is alternatively possible for the terminals 8 to 10 to have a direct exchange of control data with each other.

The communication in the wireless network is based on a TDMA frame (TDMA=Time-Division Multiple Access), which includes control channels or control time slots and data channels or data time slots. Via a control channel each terminal may request one or more data channels from a base station (compare FIG. 1) or a controller (compare FIG. 2) to transmit cells. The base station or the controller assign 4 or 8 to 10 data channels to the terminals, so that data can be transmitted during the following TDMA frame following a request.

Figure 2:
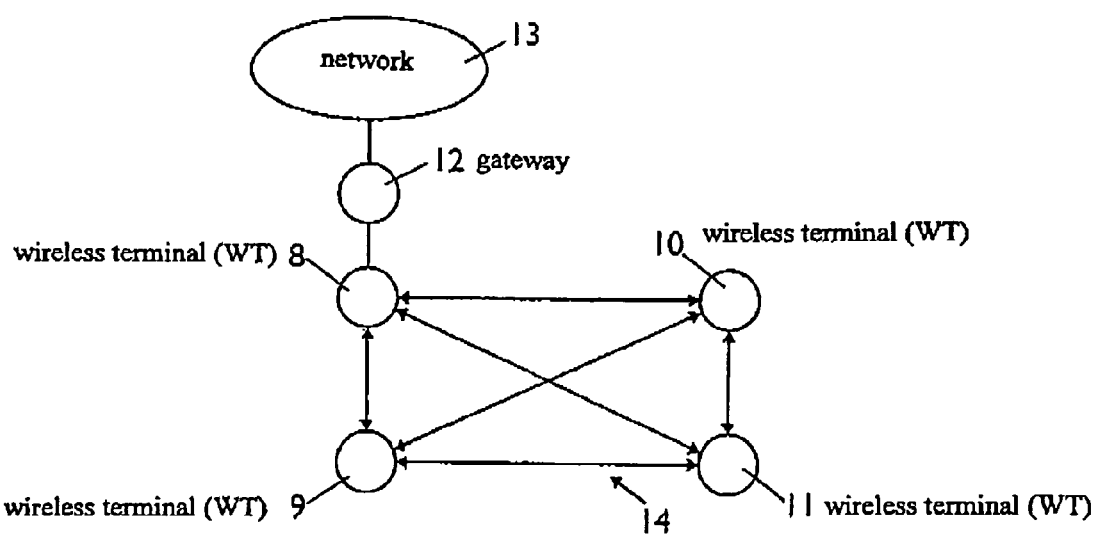

In such a network as shown in FIG. 1 or 2, which implements a TDMA method, a certain frequency range is used. It is then impossible for a transceiver device of a base station or of a terminal to switch over without delay from a reception mode to a transmission mode and vice versa. There is a non-negligible minimum time, which is referred to for short as time MT, between the two modes. The time MT is a parameter of a radio system and is to be taken into account by the part of a transceiver device responsible for the medium access control (MAC).

To take all possible traffic ratios in the wireless network into account and give various terminals enough time to change over their transmission mode, a time is defined that is longer than the time MT and is referred to as change-over time OTT. For optimizing the delay in the wireless network, which delay is caused by the change-over time OTT, an algorithm to be described hereinafter is used for assigning time slots for the data transmission.

With the algorithm to be described, a number N of time slots determined by the base station or the controller is started from, which time slots are rendered available by a TDMA frame for the data transmission. The algorithm decides which $N\_i\_j$ time slots are assigned for the transmission of data from a transmitting terminal WT_i to a receiving terminal WT_j for the following TDMA frame. $N\_i\_j$ thus denotes the number of time slots for a terminal WT_i that would like to transmit packets to the terminal WT_j. For example, 3 packets are to be transmitted from a terminal WT_1 to a terminal WT_2 {(N=3)_1_2)}, 5 packets from the terminal WT_1 to the terminal WT_4 {(N=5)_1_4}, 4 packets from the terminal WT_1 to the terminal WT_3 {(N=4)_1_3}, 1 packet from the terminal WT_3 to the terminal WT_1 {(N=1)_3_1}, 2 packets from the terminal WT_3 to the terminal WT_2 {(N=2)_3_2}, 2 packets from the terminal WT_2 to the terminal WT_3 {(N=2)_2_3}, 3 packets from the terminal WT_2 to the terminal WT_4 {(N=3)_2_4} and 5 packets from the terminal WT_4 to the terminal WT_2 {(N=5)_4_2}. Here (N=x)_i_j means that $N\_i\_j$ time slots are provided for a terminal WT_i, which transmits x packets to the terminal WT_j.

For example, the following transmission order may be determined without the algorithm being applied:

|(N=3)_1_2), (N=5)_1_4, (N=4)_1_3, (N=1)_3_1, (N=2)_3_2, (N=2)_2_3, (N=3)_2_4, (N=5)_4_2|

With this transmission order there is a delay caused by the change-over time OTT during a mode change from (N=4)_1_3 to (N=1)_3_1, because the terminal WT_1 is to change over from transmission to reception mode and the terminal WT_3 from the reception to the transmission mode, during a mode change from (N=2)_3_2 to (N=2)_2_3, because the terminal WT_3 is to change over from transmission to reception mode and the terminal WT_2 from the reception to the transmission mode, and during a mode change from (N=3)_2_4 to (N=5)_4_2, because the terminal WT_2 is to change over from the transmission to the reception mode and the terminal WT_4 from the reception to the transmission mode.

The following algorithm minimizes the delay caused by the change-over time. First a variable R(i) is defined for each terminal WT_j, which denotes the number of receiving terminals with which WT_i exchanges data in the following TDMA frame. For each $N\_i\_j$, j then varies from 1 to R(i) (j=1, . . . , R(i)). The total number of time slots that are reserved for a terminal WT_i may then be indicated by the variable S(i) with $$S(i)=N\_i\_1+N\_i\_2+ \ldots +N\_i\_R(i)$$

For the example given above, the result is:

$$S(1)=12,\ S(2)=5,\ S(3)=3,\ S(4)=5 \text{ and } R(1)=3,\ R(2)=2,\ R(3)=2,\ R(4)=1.$$

Subsequently, all the transmitting terminals WT_i are divided into two subsets A and B. The subset A contains all the transmitting terminals WT_i with R(i)>1 and the subset B all the transmitting terminals WT_i with R(i)=1.

With the example given above the terminals WT_1 with R(1)=3, WT_2 with R(2)=2 and WT_3 with R(3)=2 form part of the subset A and the terminal WT_4 with R(4)=1 forms part of subset B.

For the subset A the sorting order is determined so that the terminal WT_i transmits its S(i) packets earlier than terminal WT_j if R(i)>R(j). If R(i)=R(j), the transmission order is selected at random. After the sorting order has been determined in this way, the order of the receiving terminal WT_is determined for a transmitting terminal WT_i. The receiving terminals WT_j receiving packets from a transmitting terminal WT_i are divided into two groups A_1 and A_2.

The group A_1 comprises all the receiving terminals WT_j that have already terminated their transmission to other terminals (before WT_i starts transmitting packets). The group A_2 comprises all the receiving terminals WT_j that have not yet started their transmission and start the transmission after the terminals WT_i have terminated their transmission.

The order of the receiving terminals WT_j for a transmitting terminal WT_i is then fixed so that all the terminals WT_j of the group A_1 receive the packets from WT_i later than those of the group A_2. Within the groups A_1 and A_2 the terminals WT_j are sorted as follows:

The group A_1 (first group) is sorted so that the transmitting terminal WT_i transmits its packets in N_i_m time slots to the receiving terminal WT_m earlier than its packets in N_i_n time slots to the receiving terminal WT_n, if the terminal WT_m terminates its transmission earlier than the terminal WT_n (WT_m is a transmitting terminal earlier than WT_n).

The group A_2 (second group) is sorted so that the transmitting terminal WT_i transmits its packets in N_i_m time slots to the receiving terminal WT_m earlier than its packets in N_i_n time slots to the receiving terminal WT_n, if the terminal WT_m starts its transmission earlier than the terminal WT_n (WT_m is a transmitting terminal earlier than WT_n).

This terminates the sorting algorithm for the subset A.

In the example given above, when the sorting algorithm is implemented for the subset A, first a sorting is made for the transmitting terminal WT_1, then for the transmitting terminal WT_3 and then for the transmitting terminal WT_2. After WT_1 could first be carried out a sorting for the transmitting terminal WT_2 and then for the transmitting terminal WT_3, because R(2)=R(3). The algorithm described above for the groups A_1 and A_2 then performs a sorting of the receiving terminals receiving packets from WT_1. There is then the following order: |(N=4)_1_3, (N=3)_1_2, (N=5)_1_4|

For the transmitting terminals WT_3 and WT_2 is then used the algorithm for the groups A_1 and A_2. All in all there is then the following sorting order for the subset A:
|(N=4)_1_3, (N=3)_1_2, (N=5)_1_4, (N=2)_3_2, (N=1)_3_1, (N=3)_2_4, (N=2)_2_3|

After the sorting for the subset A has ended, the following steps are made for the sorting of the terminals of the subset B. The subset B comprises K terminals WT_i. A transmit pointer p is defined, which features the terminal WT_x transmitting last, before a terminal of the subset B starts its transmission, and a receive pointer q which features the terminal receiving data last from an arbitrary terminal. For determining the first transmitting terminal from the subset B, p and q respectively point to the last transmitting or receiving terminal of the sorting order for the subset A determined so far.

In a first step a test is made whether K=1. If this is the case, only a single terminal WT_i of the subset B is put in the sorting order as the last transmitting terminal. This also determines the associated receiving terminal of the transmitting terminal, because all the transmitting terminals in the subset B have only one receiving terminal. The sorting is then ended for the subset B.

In a second step a test is made whether K>1. If this is the case, the terminal WT_i is removed from the subset B and marked as a selected terminal WT_i if there is a terminal WT_i that is not featured by the receive pointer q and is not featured by the last transmit pointer p by the receiving terminal receiving data from the terminal WT_i. If this condition is satisfied, the terminal WT_i is removed from the subset B and a third step is proceeded to (terminal WT_i has not previously received any data and the associated receiving terminal has not previously transmitted any data). If this condition is not satisfied, an arbitrary terminal WT_i is selected from the subset B, which terminal is not featured by the last receive pointer q and is marked as a selected terminal WT_i (terminal WT_i has not previously received any data, but its associated receiving terminal has previously transmitted data). Then the third step is proceeded to.

In the third step the terminal WT_i selected in the second step is put at the end of the assignment list. The selected terminal WT_i is featured by the transmit pointer p and the terminal receiving data from WT_i is featured by the receive pointer q. K is decremented by 1 and the first step is proceeded to.

With the example there is only the terminal WT_4, which belongs to the subset B. This terminal WT_4 would like to transmit five packets to receiving terminal 2. In this way there is the following optimized sorting order for the two subsets A and B:
|(N=4)_1_3, (N=3)_1_2, (N=5)_1_4, (N=2)_3_2, (N=1)_3_1, (N=3)_2_4, (N=2)_2_3, (N=5)_4_2|

In this example there is only one delay as a result of a change-over period of the terminal WT_2, because this terminal, after transmitting two packets to the terminal WT_3, changes to the reception mode to receive five packets from the terminal WT_4. In the other terminal there is no delay resulting from the change-over period. For example, the terminal WT_1, after transmitting four packets to the terminal WT_3, after transmitting three packets to the terminal WT_2 and after transmitting five packets to the terminal WT_4 during the period of two time slots, has enough time to change from the transmission to the reception mode. During this period of two time slots the terminal WT_3 transmits two packets to the terminal WT_2.

It is alternatively possible to determine the sorting order so that the terminals of the second subset transmit or receive respectively earlier than the terminals of the first subset. The terminals of the second subset, after the sorting order of the first subset has been determined, can also be distributed over the sorted terminals of the first subset. It should then be borne in mind that a transmitting terminal is a receiving terminal neither in the previous nor in the subsequent time slot and a receiving terminal is a transmitting terminal neither in the preceding nor in the subsequent time slot.

The invention claimed is:

1. A wireless network for assigning time slots in a wireless communication of packets, comprising:
   a plurality of transmitting and receiving terminals; and
   a central station for determining a first subset of the transmitting terminals that intend to transmit packets to the receiving terminals and a second subset that includes the transmitting terminals that do not belong to the first subset; the central station determining a transmission order according to a decreasing number of the receiving terminals such that a transmitting terminals transmits first if said transmitting terminal intends to transmit the largest number of the receiving terminals; the central station sorting the receiving terminals that receive the packets from the first subset of the transmitting terminals into a first group which includes the receiving terminals that have been used as the transmitting terminals and into a second group which includes the remaining of the receiving terminals; the central station determining a receiving order in the first and second groups in accordance with the transmission order; the central station selecting the receiving terminal of the second group prior to the first group.

2. The wireless network of claim 1, wherein the central station determines the transmission order of the transmitting terminals of the second subset in such a way that all the transmitting terminals are selected that have not previously been either a transmitting terminal or a receiving terminal, and then all the transmitting terminals are selected that have not previously been a receiving terminal, the transmitting terminals of the second subset transmitting either before or after the transmitting terminals of the first subset.

3. The wireless network of claim 1, wherein the central station sorts the transmitting terminals of the second subset into the transmission order in such a way that a transmitting terminal is not a receiving terminal in a preceding time slot and a following time slot, and a receiving terminal is not a transmitting terminal in the preceding time slot and the following time slot.

* * * * *